United States Patent Office 3,243,448
Patented Mar. 29, 1966

3,243,448
ALIPHATIC ISOCYANATE PREPARATION
William E. Erner, Wilmington, Del., assignor to Air Products and Chemicals, Inc., Philadelphia, Pa., a corporation of Delaware
No Drawing. Filed Aug. 24, 1962, Ser. No. 219,122
2 Claims. (Cl. 260—453)

This invention relates to the preparation of volatile low boiling aliphatic isocyanates and particularly to the preparation of such compounds from the corresponding aliphatic isothiocyanato compounds.

Certain aliphatic compounds containing a hydrocarbon group and one or more isocyanato groups have been prepared in research quantities in the laboratory by the reaction of phosgene with the corresponding amine. However, various difficulties are connected with such a synthesis, and phosgene is not as conveniently employed in the organic synthesis laboratory as many other reagents. Hence, there has been an unsatisfied demand for the development of syntheses utilizing reagents other than phosgene for making aliphatic isocyanates. Heretofore, tonnage quantities of aromatic isocyanates have been manufactured so that a considerable portion of the utilization of compounds containing the isocyanato group has involved such aromatic isocyanato compounds. Heretofore, certain aliphatic isothiocyanato compounds have been available in pure form by reason of their commercial utilization as insecticides and/or other specialized purposes. However, there has been no teaching pertinent to the preparation of volatile aliphatic compounds containing at least one isocyanato group and employing commercially available chemicals as the starting reagents for a simple synthesis.

In accordance with the present invention, a low boiling, volatile compound consisting of an aliphatic hydrocarbon group and at least one isocyanato group is prepared by a method which consists essentially of reacting an aromatic compound having at least one isocyanato group with an aliphatic compound having the desired hydrocarbon group, and having at least one isothiocyanato group, the reaction being conducted at a temperature sufficiently high to distill from the reaction mixture the aliphatic isocyanato compound resulting as a product of the process, but below the temperature at which the corresponding aliphatic isothiocyanato compound is volatilized.

The nature of the invention is further clarified by reference to a plurality of examples.

Example I

A solution is prepared consisting of three moles of toluene diisocyanate and two moles of allyl isothiocyanate. The solution is heated at a temperature in the range of 190° C. to 210° C. in a distillation apparatus characterized by a fractionating column containing glass helices as a packing. The column is operated at total reflux for some time until the temperature at the top of the column is indicative of reasonably stable conditions. The column is thereafter operated for the distillation of the allyl isocyanate product, which is obtained in a yield of 23% of the theoretically possible allyl isocyanate. The boiling point of the product is 88° (±1°) and initial tests indicated that the product was characterized by satisfactory purity. In controlling the temperature of the reaction mixture undergoing the exchange reaction, care is exercised to avoid runaway temperatures, the reaction being quenched by rapid cooling if the exothermic polymerization of the diisocyanate or other competitive reaction brings the reaction mixture to a temperature above 210° C.

Example II

A solution is prepared consisting of three moles of phenyl isocyanate (B.P. 165.6° C.) and one mole of ethylisothiocyanate (B.P. 132° C.). The reaction mixture is maintained at total reflux for ten minutes, after which the product, ethylisocyanate (B.P. 60° C.) is withdrawn as a distillate. It should be noted that the approximately 72° difference between the boiling points of the aliphatic isocyanate and isothiocyanate compounds provides the range within which the reaction is conducted at atmospheric pressure.

Example III

One mole of butyl isothiocyanate is dissolved in 3 moles of naphthyl isocyanate, or 3 equivalents of —NCO per equivalent of —NCS, and the reaction mixture refluxed to promote the exchange reaction. Although either superatmospheric or subatmospheric pressure may be used, it is generally more convenient to employ substantially atmospheric pressure, the temperature being adjusted in accordance with the pressure to be between the low volatilization temperature of the aliphatic isocyanate compound and the high volatilization temperature of the corresponding isothiocyanato compound.

The butyl isocyanate is distilled from the reaction mixture and is sufficiently pure to be employed as a component in formulations for making polyurethane plastics, polyurethane fibers, polyurethane foam products, and related materials.

Obviously, many modifications and variations of the invention as hereinbefore set forth may be made without departing from the spirit and scope thereof, and therefore only such limitations should be imposed as are indicated in the appended claims.

What is claimed is:
1. The method of making a volatile low boiling aliphatic isocyanato compound having a boiling point lower than 250° C. and lower than the boiling point of tolylene diisocyanate which method includes the step of mixing a stoichiometric excess of tolylene diisocyanate and an aliphatic isothiocyanato compound having an aliphatic group corresponding to the aliphatic group in the desired isocyanato compound; feeding to a distillation zone said mixture at a temperature and pressure at which the aliphatic isocyanato compound is distilled from the reaction mixture to leave a residue comprising aromatic isothiocyanato compound as a result of the exchange reaction, said temperature and pressure being below the normal boiling point of the tolylene diisocyanate; and recovering the thus distilled volatile low boiling aliphatic isocyanato compound.

2. The method of making allyl isocyanate which consists essentially of conducting an exchange reaction between about 3 mols of tolylene diisocyanate and about one mol of allyl isothiocyanate at about atmospheric pressure and at about 200° C.; and recovering allyl isocyanate as the distillate by distillation of the reaction mixture.

References Cited by the Examiner

Case, Nature (London), vol. 183, No. 4662, Mar. 7, 1959, p. 675.

CHARLES B. PARKER, Primary Examiner.

STANLEY H. LIBERSTEIN, DALE R. MAHANAND,
Assistant Examiners.